(12) United States Patent
Ishii et al.

(10) Patent No.: US 6,473,879 B1
(45) Date of Patent: Oct. 29, 2002

(54) ENCODING DEVICE AND DECODING DEVICE SUITABLE FOR DUBBING

(75) Inventors: Yoshiki Ishii, Yokohama; Akihiro Shikakura, Kawasaki; Tetsuya Shimizu, Yokohama, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/502,210

(22) Filed: Feb. 11, 2000

Related U.S. Application Data

(62) Division of application No. 08/312,939, filed on Sep. 30, 1994, now Pat. No. 6,055,664, which is a continuation of application No. 07/550,906, filed on Jul. 11, 1990, now abandoned.

(30) Foreign Application Priority Data

| Jul. 13, 1989 | (JP) | 1-181159 |
|---|---|---|
| Sep. 29, 1989 | (JP) | 1-252305 |
| Sep. 29, 1989 | (JP) | 1-252308 |
| Dec. 14, 1989 | (JP) | 1-324585 |

(51) Int. Cl.⁷ ............................................. G11C 29/00
(52) U.S. Cl. .................................. 714/769; 714/805
(58) Field of Search .............................. 714/758, 752, 714/765, 769, 805

(56) References Cited

U.S. PATENT DOCUMENTS

| 4,072,853 A | | 2/1978 | Barlow et al. | 371/37.7 |
|---|---|---|---|---|
| 4,244,049 A | | 1/1981 | York et al. | 371/40.1 |
| 4,306,305 A | | 12/1981 | Doi et al. | 371/37.4 |
| 4,329,708 A | | 5/1982 | Yamamoto et al. | 371/31 X |
| 4,364,081 A | | 12/1982 | Hashimoto et al. | 348/617 |
| 4,412,165 A | * | 10/1983 | Case et al. | 318/363 |
| 4,433,387 A | * | 2/1984 | Dyer et al. | 702/159 |
| 4,466,099 A | * | 8/1984 | Meltzer | 714/798 |
| 4,649,542 A | * | 3/1987 | Nishimura et al. | 714/755 |
| 4,675,869 A | * | 6/1987 | Driessen | 714/759 |
| 4,675,870 A | * | 6/1987 | Baggen | 714/780 |

(List continued on next page.)

FOREIGN PATENT DOCUMENTS

| JP | 60133573 | 7/1985 | C11B/20/18 |
|---|---|---|---|
| JP | 61018276 | 1/1986 | H04N/5/93 |
| JP | 61112259 | 5/1986 | |
| JP | 62026681 | 2/1987 | C11B/27/02 |
| JP | 1-114180 | 2/1989 | H04N/7/137 |
| JP | 162920 | 3/1989 | |
| JP | 173560 | 3/1989 | |
| JP | 01062920 | 3/1989 | H03N/13/00 |
| JP | 01073560 | 3/1989 | C11B/20/10 |
| JP | 401296460 A | * 11/1989 | G11B/20/10 |
| JP | 02108279 | 4/1990 | C11B/20/10 |
| JP | 2108279 | 4/1990 | |
| WO | WO 8302344 | 7/1983 | |

*Primary Examiner*—Albert Decady
*Assistant Examiner*—Joseph D. Torres
(74) *Attorney, Agent, or Firm*—Fitzpatrick, Cella, Harper & Scinto

(57) ABSTRACT

Where a recording medium recorded on at a slave side apparatus is reproduced, it has been made possible to perform on cite modification processing identical to that conducted at a master side apparatus, by reproducing, at the master side apparatus, the primary information added with parity symbol for error correction from the recording medium on which the primary information is recorded, correcting the symbol error of primary information reproduced at the reproducing means using the reproduced parity symbol, producing the flag which indicates the production of an uncorrectable symbol error in one unit of a block of a specified amount of information and thus outputting the modification information corresponding to the primary information and the flag and forming, at the slave side, the parity symbol for correction of error of primary information output at the master side apparatus and recording the primary information with the parity symbol and modification information, on the same recording medium. It has also become possible to conduct satisfactory modification processing when the symbol error is produced.

11 Claims, 12 Drawing Sheets

U.S. PATENT DOCUMENTS

| | | | | |
|---|---|---|---|---|
| 4,683,572 A | * | 7/1987 | Baggen et al. | 714/756 |
| 4,706,111 A | | 11/1987 | Abe | 358/21 R |
| 4,742,519 A | | 5/1988 | Abe et al. | 371/37.4 |
| 4,774,700 A | * | 9/1988 | Satoh et al. | 369/47.14 |
| 4,780,809 A | * | 10/1988 | Woffinden et al. | 714/48 |
| 4,792,953 A | | 12/1988 | Pasdera | 371/31 |
| 4,817,095 A | | 3/1989 | Smelser et al. | 371/13 X |
| 4,873,688 A | * | 10/1989 | Maki et al. | 714/784 |
| 4,882,731 A | * | 11/1989 | van Gils | 714/757 |
| 4,918,694 A | | 4/1990 | Preissler | 371/37.4 |
| 4,939,694 A | * | 7/1990 | Eaton et al. | 365/200 |
| 4,975,866 A | | 12/1990 | Aoki et al. | 364/723 |
| 4,994,925 A | | 2/1991 | Yamashita et al. | 386/101 |
| 5,038,229 A | | 8/1991 | Mester | 360/38.1 |
| 5,049,990 A | * | 9/1991 | Kondo et al. | 375/240.24 |
| 5,070,503 A | | 12/1991 | Shikakura | 371/37.1 |
| 5,142,537 A | * | 8/1992 | Kutner et al. | 714/747 |
| 5,220,568 A | * | 6/1993 | Howe et al. | 714/782 |
| 6,055,664 A | * | 4/2000 | Ishii et al. | 714/763 |
| 6,226,323 B1 | * | 5/2001 | Tan et al. | 375/233 |

\* cited by examiner

○ : RESET DATA
× : ERROR

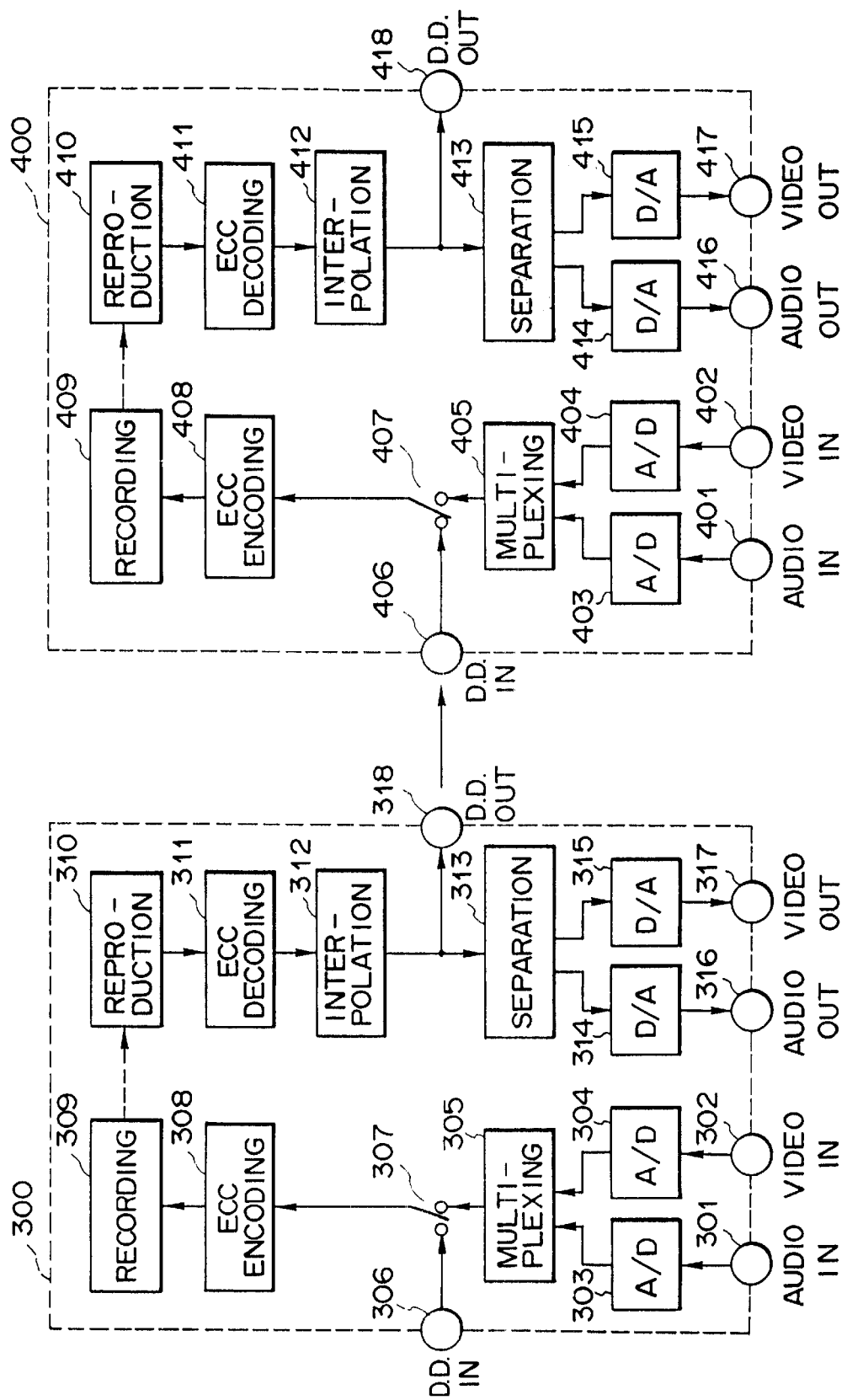

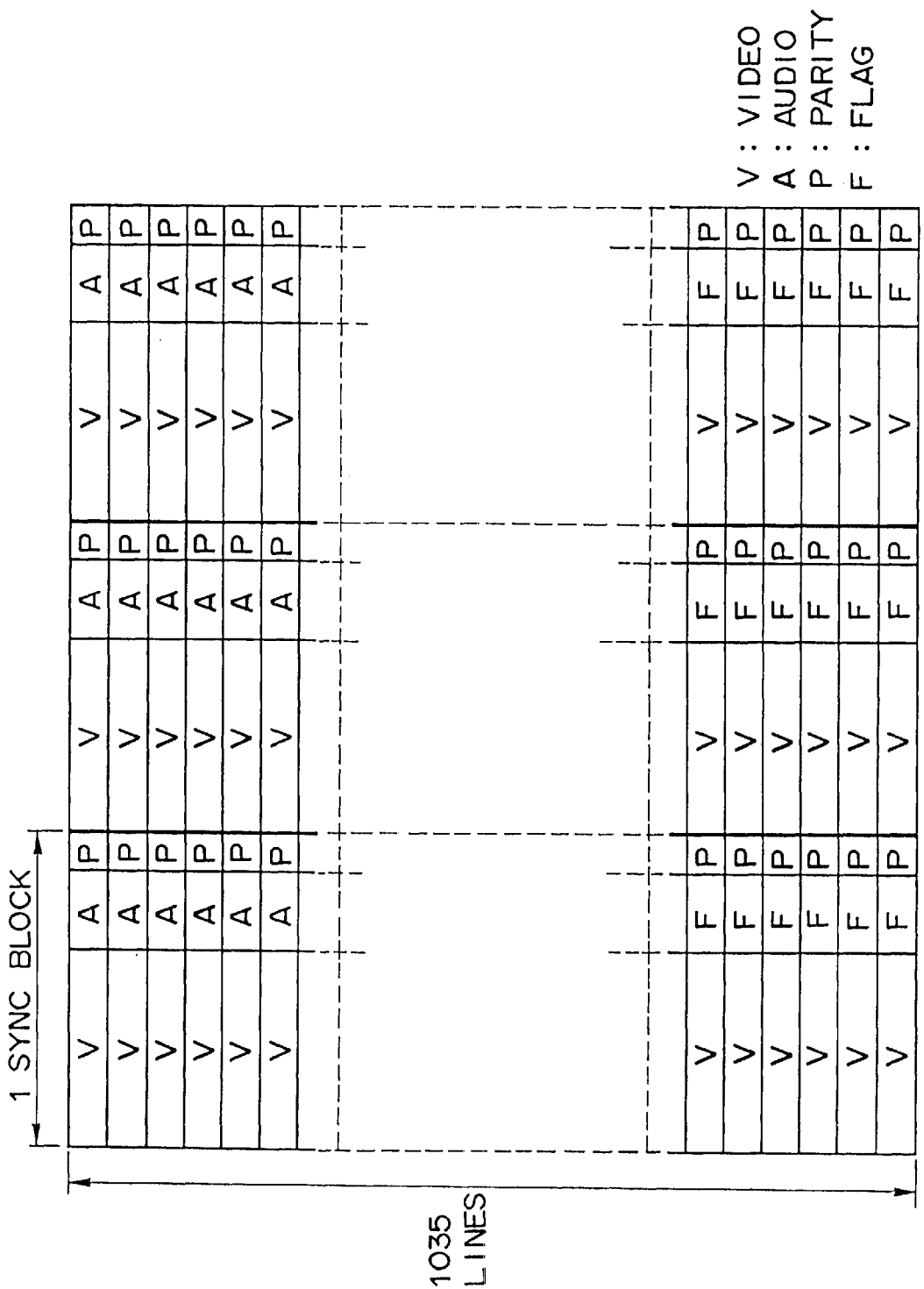

P1 : TRAVERSE DIRECTION PARITY
P2 : LONGITUDINAL DIRECTION PARITY

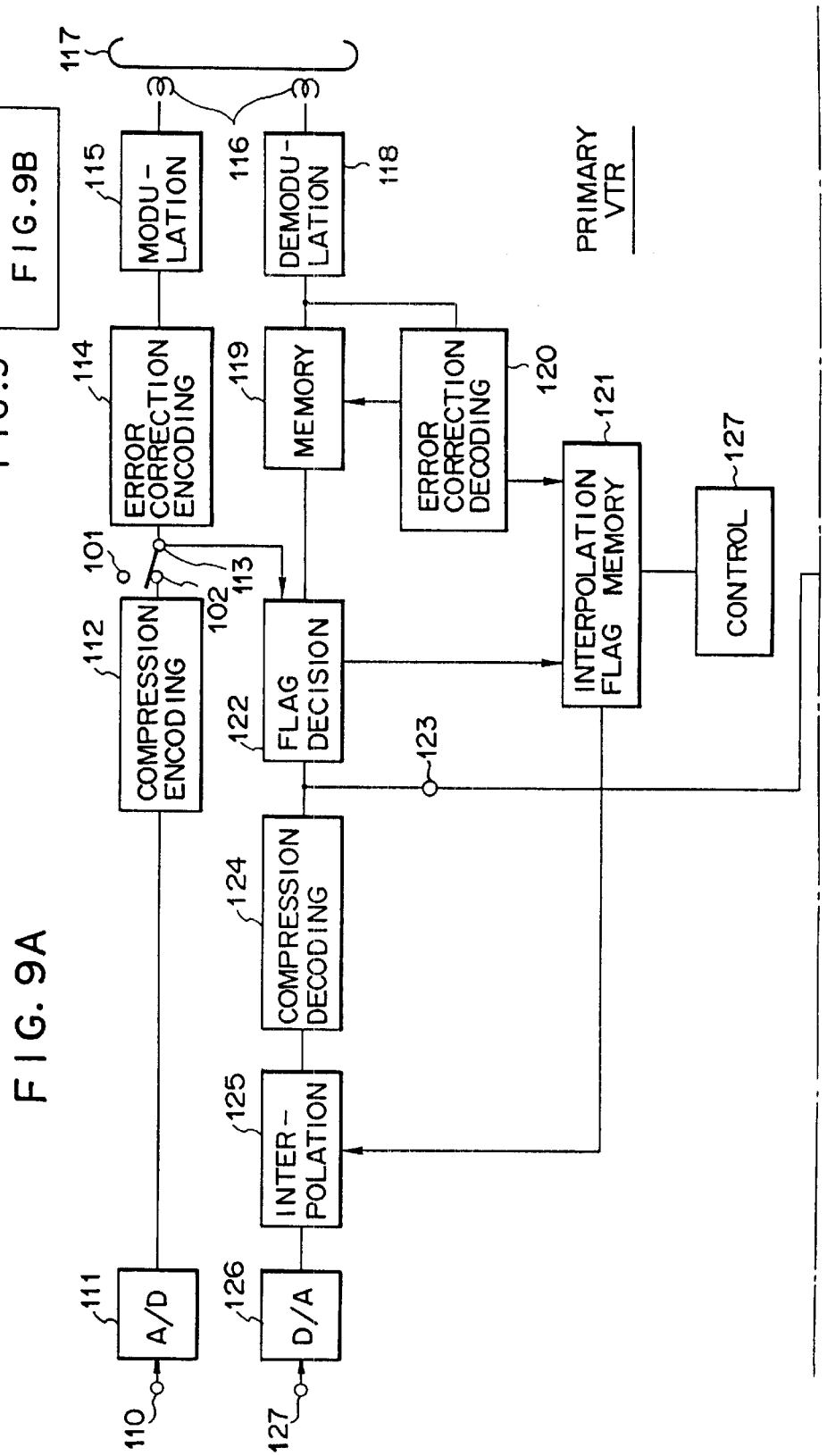

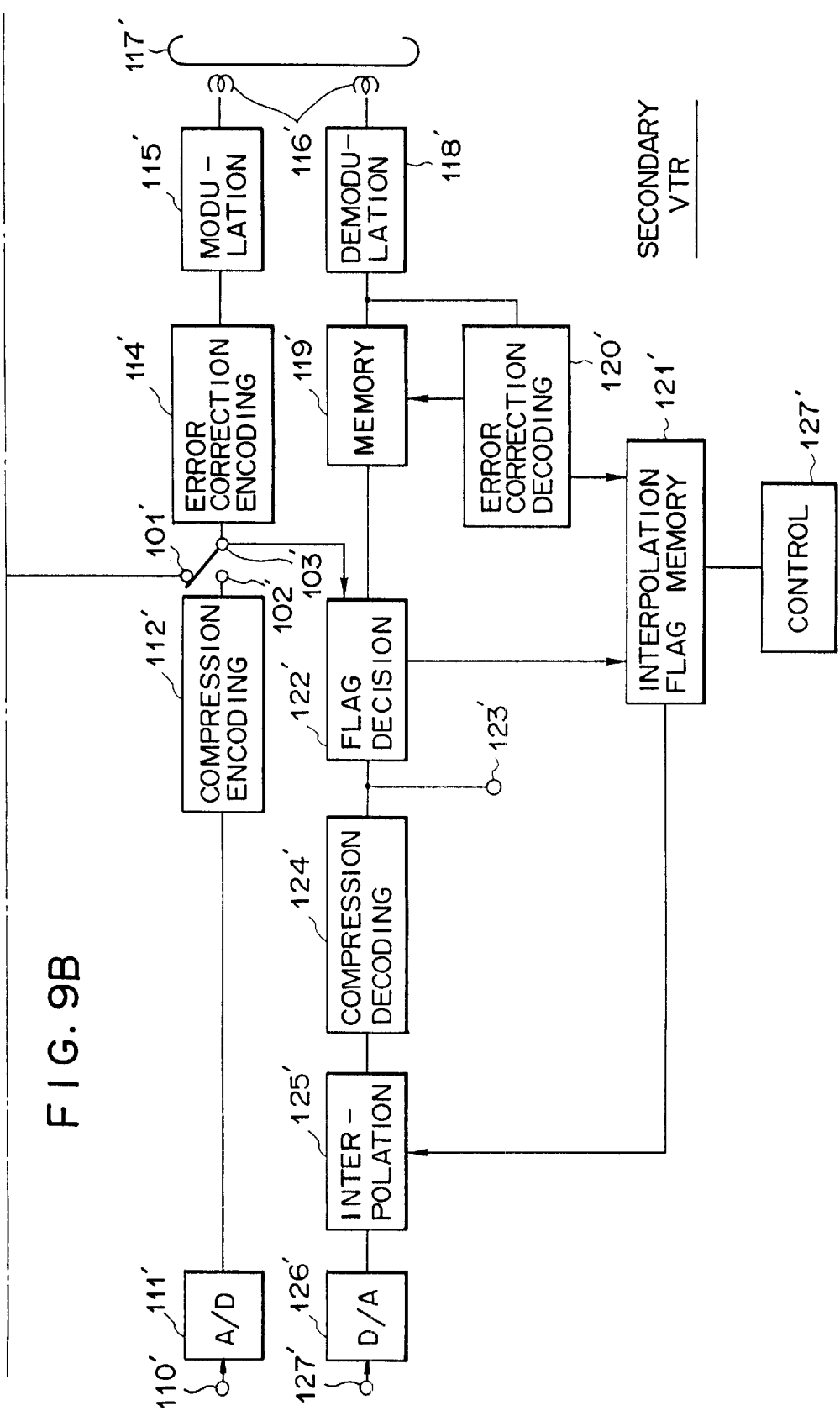

MIDTREAD TYPE

ENCODING DEVICE AND DECODING DEVICE SUITABLE FOR DUBBING

CONTINUITY DATA

This application is a division of application No. 08/312,939, filed on Sep. 30, 1994, now U.S. Pat. No. 6,055,664, which is a continuation of application No. 07/550,906, filed Jul. 11, 1990, now abandoned.

BACKGROUND OF THE INVENTION

1. Field of the Invention

The present invention is related to encoding and decoding devices suitable for dubbing, and in particular to their handling at the time of occurrence of an uncorrectable symbol error.

2. Related Background Art

Digital VTR, etc., may be taken as an example of a system to record and reproduce image and aural signals.

With the recording and reproducing device of such digital VTR, the analog signals (aural signal and image signal) to be recorded are first converted into digital code, and error correction encoding is executed by the addition of a parity bit for error correction by an error correction encoding circuit (ECC encoding circuit) and recording it on a recording medium. On the other hand, in order to reproduce analog signals from the digital data recorded on the recording medium of the recording and reproducing device, first the digital data are reproduced from the recording medium, the data are input into an error correction decoding circuit (ECC decoding circuit), the symbol errors produced upon recording and reproduction are corrected there as much as possible, error symbols which could not be corrected by the ECC decoding circuit are interpolated (modified) by publicly known method in an interpolation circuit (for example, interpolated by the average value of the preceding and succeeding data), the output of the interpolation circuit is converted into an analog signal, and thus the original signals are reproduced.

In order to execute dubbing of signals digitally recorded on the recording medium as they are in digital mode by using two sets of recording and reproducing units with such construction, the digital data taken out of the interpolation circuit of the recording and reproducing device at one side are entered into the ECC encoding circuit of the other recording and reproducing device at the other side, and the signals are ECC-encoded and recorded in the recording medium. As above, recorded signals can be dubbed as they are in the digital mode, without being reconverted into analog signals.

On the other hand, another method for compression-encoding of image information which has been publicly known is the method like DPCM encoding by midtread type quantifier, wherein the symbols once encoded are decoded into baseband digital signals and then encoded again to obtain the same symbols as before. When such encoding method is employed, deterioration due to encoding occurs only at the time of initial encoding, and even when encoding and decoding are repeated thereafter in digital signals, deterioration does not accumulate and dubbing and editing in the baseband digital signal mode can be executed without accompanying deterioration.

However, in the case of image information, etc., it has been the general practice to modify by interpolation to deal with uncorrectable errors generated at the time of reproduction of recorded information (upon transmission, in a broad sense) and if thus modified information is encoded again, encoding error generates at that time and it has been a problem. As the result due to the deterioration caused by modifying coupled with deterioration caused by encoding, accumulation of deterioration proceeds as encoding and decoding are repeated.

In addition, also upon reproduction of dubbing data by recording-reproducing device, the dubbed data are reproduced without being identified as to whether they are interpolated data or correct data, and data which are judged to be uncorrectable at the ECC decoding circuit of the recording and reproducing device of the other side may be interpolated by using data recorded after being interpolated at the time of dubbing by the interpolation circuit, and if so, it results in the deterioration of picture quality and sound quality.

SUMMARY OF THE INVENTION

The objective of the present invention is to solve the problems as aforesaid.

Another objective of the present invention is to minimize the deterioration of dubbing data caused by the presence of information modified by interpolation.

With such objective in view, there is provided an encoding apparatus comprising:
(a) first input means for inputting the primary information;
(b) second input means for inputting flag information which indicates production or non-production of a past uncorrectable symbol error of the aforesaid primary information for each unit of a specified block of information amount;
(c) error correction encoding means for forming a parity symbol to correct the error of the primary information input by the aforesaid first input means and for adding said parity symbol to said primary information; and
(d) recording means for recording the primary information with the parity symbol and said flag information on the same recording medium.

According to the present invention, there is also provided a decoding apparatus which reproduces the primary information with the parity symbol for correction of an error from the recording medium on which the first flag information indicating said primary information and the production or non-production of an uncorrectable past symbol error as one unit of the specified block of information amount is recorded, comprising:
(a) reproducing means for reproducing said primary information with said parity symbol and said flag information from said recording medium;
(b) error correcting means for correcting the symbol error of the primary information reproduced by said reproducing means using the parity symbol reproduced by said reproducing means and for producing second flag information indicating the production of an uncorrectable symbol error in said block unit; and
(c) modifying means for modifying, in said block unit, said primary information having gone through the error correcting means by said first flag information and said second flag information having been reproduced by said reproducing means.

Other objectives and the characteristic features of the present invention shall be made evident by the detailed explanation of the preferred embodiments of the present invention in reference to the drawings to be stated hereunder.

BRIEF DESCRIPTION OF THE DRAWINGS

FIG. 6 is a drawing to show the composition of a dubbing system as an example of an embodiment of the invention;

FIG. 8B is a drawing to show a concrete example of composition of one frame in FIG. 7;

FIG. 9 is a block diagram to show the composition of dubbing system as an example of an embodiment of the present invention.

DETAILED DESCRIPTION OF THE PREFERRED EMBODIMENTS

Hereunder and explained the preferred embodiments of the present invention.

Figure 1:
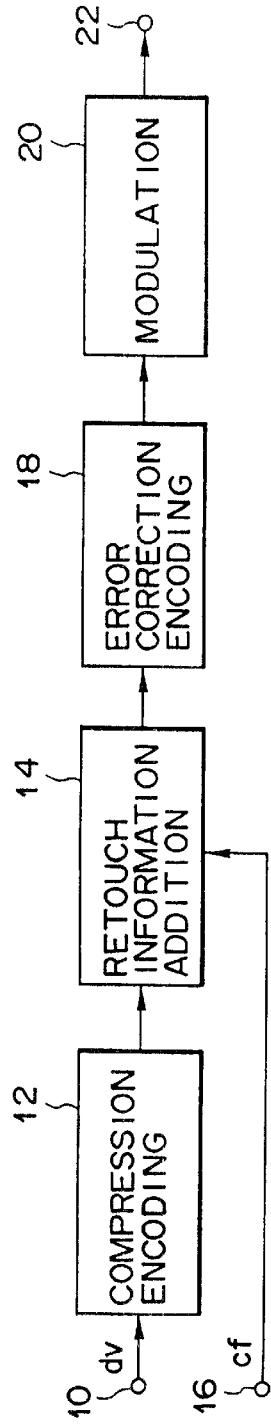
FIG. 1 is the block diagram to show the composition of the encoding device of an embodiment of the present invention.

FIG. 1 is a block diagram to show the composition of the encoding device which is an embodiment of the present invention. Hereunder the supply source of digital-video signal shall be called master side and the receiving unit shall be called slave-side. Digital-video signal dv to be entered into the input terminal 10 is compressed by compression encoding circuit 12 and impressed on the modification information addition circuit 14.

Modification information cf which indicates whether modification has been conducted or not is supplied by the preceding stage encoding-decoding device to the modification information addition circuit 14 via input terminal 16, and modification information addition circuit 14 outputs the symbol to be output by the compression encoding circuit 12 after adding such modification information cf thereto. When the encoding circuit indicated in FIG. 1 is used not as the slave side but in the initial stage or when it is connected to other encoder type devices, modification information cf is not supplied to the input terminal 16. In such case, the modification information addition circuit 14 adds, instead of modification information cf, the information corresponding to the modification information which has not been modified in the past. When variable-length symbols are used as the data format, it may be so arranged that modification information cf is added only when it is required.

The output of modification information addition circuit 14 is fed to the error correction encoding circuit 18 and after being coupled with parity symbol for error correction, it is modulated by modulation circuit 20, so that it fits the transmission route and it is delivered from the output terminal 22 to the transmission route. Transmission route includes, in addition to communication circuit, such recording media as magnetic disc, magnetic tape, etc.

Figure 2:
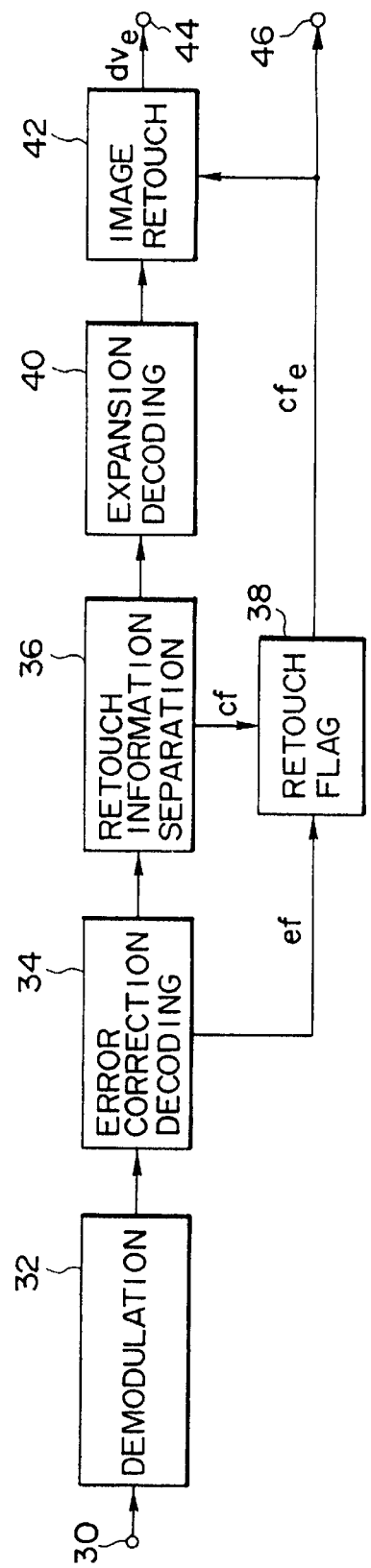
FIG. 2 is the block diagram to show the composition of the decoding device of an embodiment of the present invention.

FIG. 2 is the block diagram to show the composition of a decoding device which is an embodiment of the present invention. Encoding data are input from transmission route into the input terminal 30, demodulation circuit 32 demodulates it and error correction decoding circuit 34 detects and corrects the error symbols at the transmission route. Error correction decoding circuit 34 outputs the error-corrected data to the modification information separation circuit 38 and outputs the uncorrectable flag ef to the modification flag producing circuit 38 in response to the production of uncorrectable data. Modification information separation circuit 36 separates the modification information cf added at the master side (for example by modification information addition circuit 14) and the image data which have been compression-encoded and supplies the former to the modification flag production circuit 38 and the latter to the expansion decoding circuit 40. Expansion decoding circuit 40 decodes the compression-encoded image data and expands its information volume.

When the encoding system is such that the results of the first encoding and decoding are reproducible in the second and the succeeding repetitions of encoding and decoding (for example in the DPCM encoding system utilizing midtread type quantifying characteristics), the output of expansion decoding circuit 40 of the slave device is identical with the output of the expansion decoding circuit of the master device corresponding to the said expansion decoding circuit 40.

Modification flag production circuit 38 produces, from the error-flag ef of error correction circuit 34 and modification information cf given by the modification information separation circuit 36, a new modification flag cfe which represents the two flags ef and cf. Image modification circuit 42 modifies the output of expansion decoding circuit 40 according to the modification flag cfe and outputs it to the output terminal 44 as the digital-video signal dve. Modification flag cfe is output at the output terminal 46 to the next stage encoding device as the modification information cf.

Figure 3A:
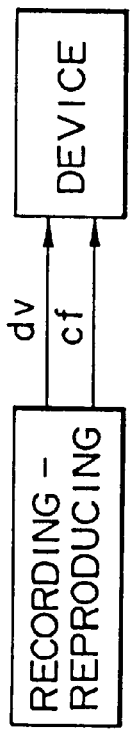
FIGS. 3A–3C are drawings to indicate the system composition which employs the devices of FIG. 1 and FIG. 2.
Figure 3B:
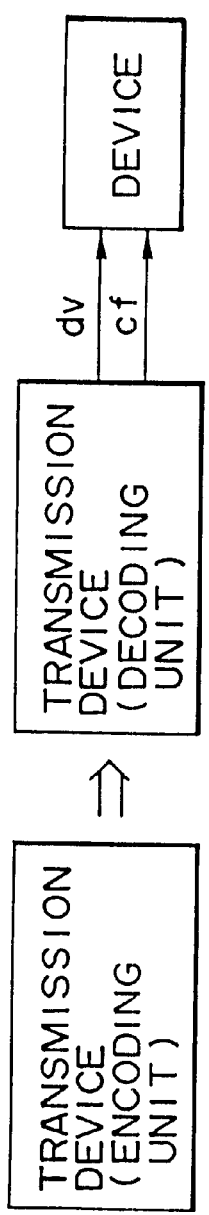
Figure 3C:
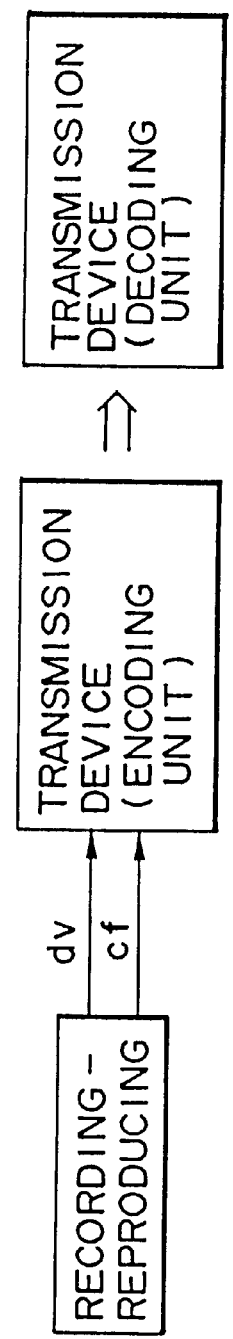

Next is explained an example of system composition of the case when the aforesaid device is applied to the system composed of digital image recording and reproducing device or digital image transmission device, in reference to FIGS. 3A–3C. FIG. 3A shows the system composition of the case when two recording and reproducing devices at the master side and the slave side are connected and dubbing is conducted on the digital video signal. When the modification flag cf at the master side is recorded at the slave side and no error is produced at the slave side, the modifying action at the master side is reproduced and therefore as long as no error is produced at the master side data, deterioration at the slave side encoding is not added to the master side modification data and thus master output and slave output become identical.

FIG. 3B indicates an example of the system composition for recording the image data received from the transmission medium on the recording and reproducing device wherein recording and reproduction are done without deterioration of the modified data as in the foregoing example. FIG. 3C shows an example of system composition of the case where the digital output of recording and reproducing device is encoded by the transmission device and delivered to the transmission route. These are simply examples of system composition while the actual connections are of course made via a digital signal converter, etc.

Next the modifying action by modification flag cf is explained in a concrete manner. According to the present invention, an arbitrary modifying method may be employed depending on the encoding system and the characteristics of transmission error, but here explanation shall be made taking as an example the line interpolation method for DPCM encoding. In the case of DPCM encoding, when an error is produced, it influences the decoded value at the later stage and it propagates in the line direction. To prevent such propagation, reset values (PCM symbols which are not DPCM-encoded) are provided at a preset distance. The block composed of the continuous data between such reset values is called a line-block and the method to interpolate the line-block where the error was produced by the data of the line-blocks above and below such error-containing line-block is known to be a highly effective modifying method in bringing about visual improvement. In this case, the aforesaid modification flag cf is added for each line-block and an error flag ef is also produced for each line-block.

Figure 4A:
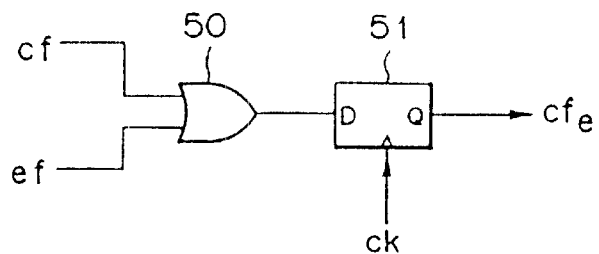
FIG. 4A is a drawing to illustrate an example of composition of a retouch flag producing circuit of FIG. 2.

FIG. 4A is the drawing to illustrate a concrete example of composition of the modification flag producing circuit 38 of FIG. 2. Modification information cf is at the high level ("H") for the block for which retouching has been made in the past and at the low level ("L") for the block where no modification has been made. Error flag ef becomes "H" for the line-block which contains an uncorrectable symbol error and "L" for the line-block which is free from such uncorrectable symbol error.

As illustrated in the drawing, when either of the modification information cf or error flag ef is "H", the output of OR-gate 50 becomes "H" and such output is synchronized with each line-block from expansion decoding circuit 40 by latch 51 and is output as the modification flag cfe.

Figure 4B:
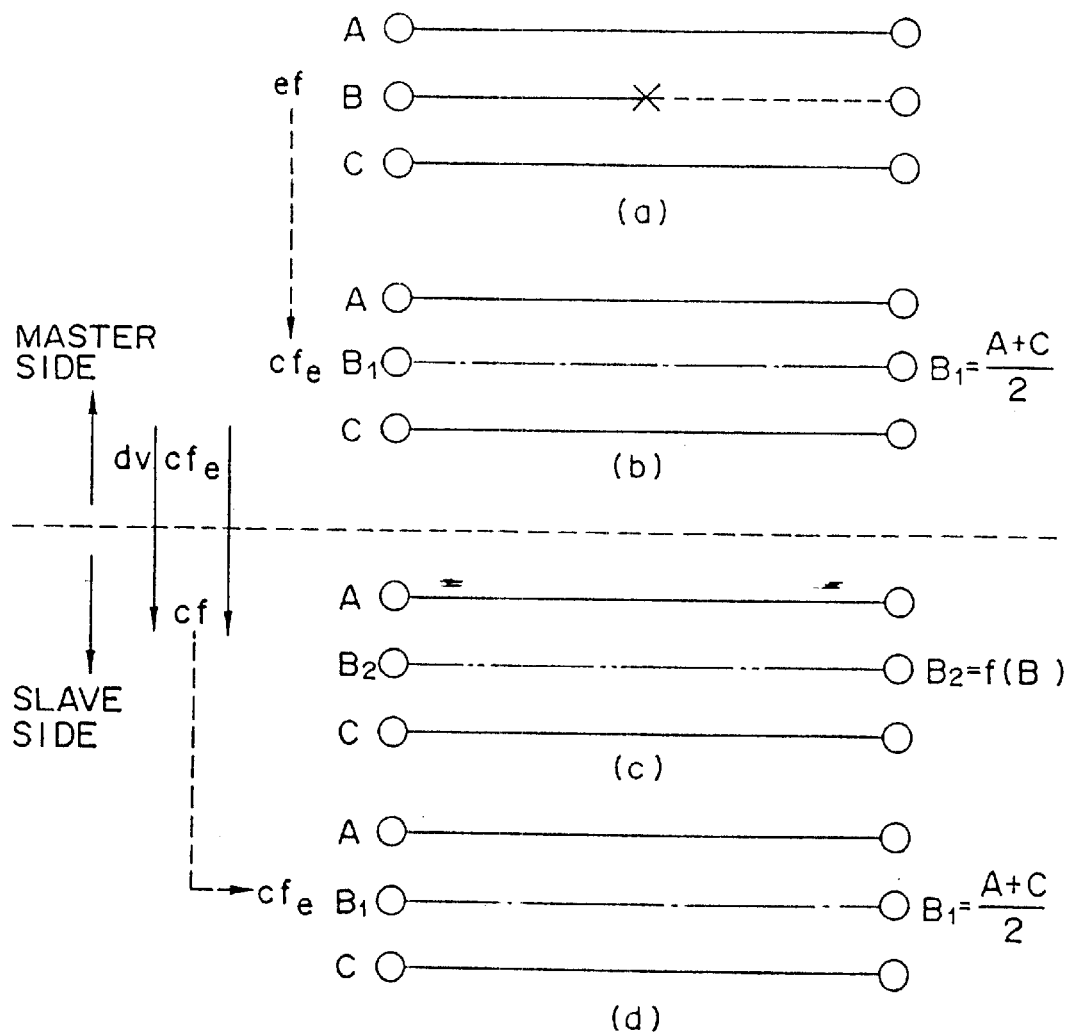
FIG. 4B is a drawing to explain the performance of the decoding device of FIG. 2 by the retouch flag producing circuit of FIG. 4A.

FIG. 4B(a) indicates the output of the expansion decoding circuit 40 at the master side. It is observed that an error is produced at line-block B and that error-flag ef has become "H". FIG. 4B(b) shows the output of image modification circuit 42 at the master side. Modification is done by substituting (interpolating) the data of line-block B for the interpolation data B1 obtained by B1=(A+C)/2 by modification flag cfe. FIG. 4B(C) shows the output of the expansion decoding circuit 40 at the slave side. Since the error caused by encoding and decoding at the slave side is added to B1 which has been modified at the master side, line-block B2 does not become equivalent to B1. In the conventional example, this B2 constitutes the output of the slave side device. FIG. 4B(a) shows the output of the slave side image modification circuit 42. Modification flag cfe becomes "H" due to the modification information cf transmitted from the master side by line-block B1 and at the slave side also, interpolation of B1=(A+C)/2 is done and thus the results obtained become identical to the master side output.

As is easily understood from the above explanation, according to the aforesaid embodiment, even when encoding and decoding are repeated, deterioration due to modifying made on the way is not allowed to propagate. It is highly useful for dubbing, editing and transmission devices, etc.

Figure 5A:
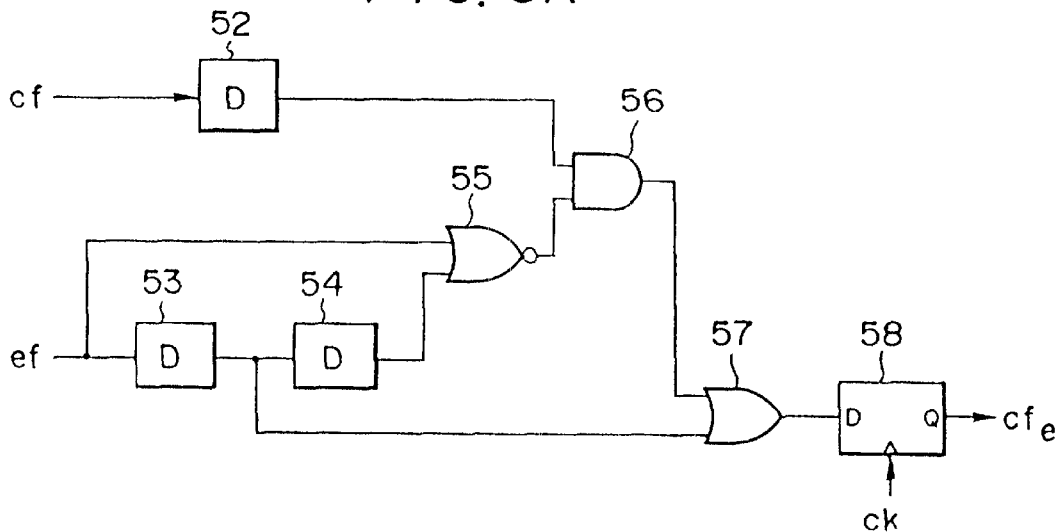
FIG. 5A is a drawing to illustrate another example of composition of the retouch flag production circuit of FIG. 2.

FIG. 5A is a drawing to indicate another concrete example of composition of the modification flag producing circuit 38 of FIG. 2. In the Figure, 52, 53 and 54 form the circuit to delay the modification information cf and error flag ef for the period of one line. The modification information cf and error flag ef of the line block being processed are output at the delay circuit 52 and 53. Normally "H" output is obtained at OR-gate 57 as long as either of modification information cf or the error flag ef is "H" and this OR-gate 57 functions in the same manner as OR-gate 50 of FIG. 4. However, if the error flag ef is "H" at either the line-block corresponding to the line before or after the line-block being processed, modification (interpolation) of such line-block does not produce satisfactory modification information, since the retouch information cf is "H".

When "H" error flag exists at either of the line•blocks corresponding to the line before and the line after the line•block being noticed, the output of NOR-gate 55 becomes "L", and "L" is supplied to OR-gate 57 by AND-gate 56 even when modification information cf is "H", and thus modification information cf is neglected. Latch 58 synchronizes the output of OR-gate 57 with the respective line•block given by expansion decoding circuit 40 and outputs it as modification flag cfe.

Figure 5B:
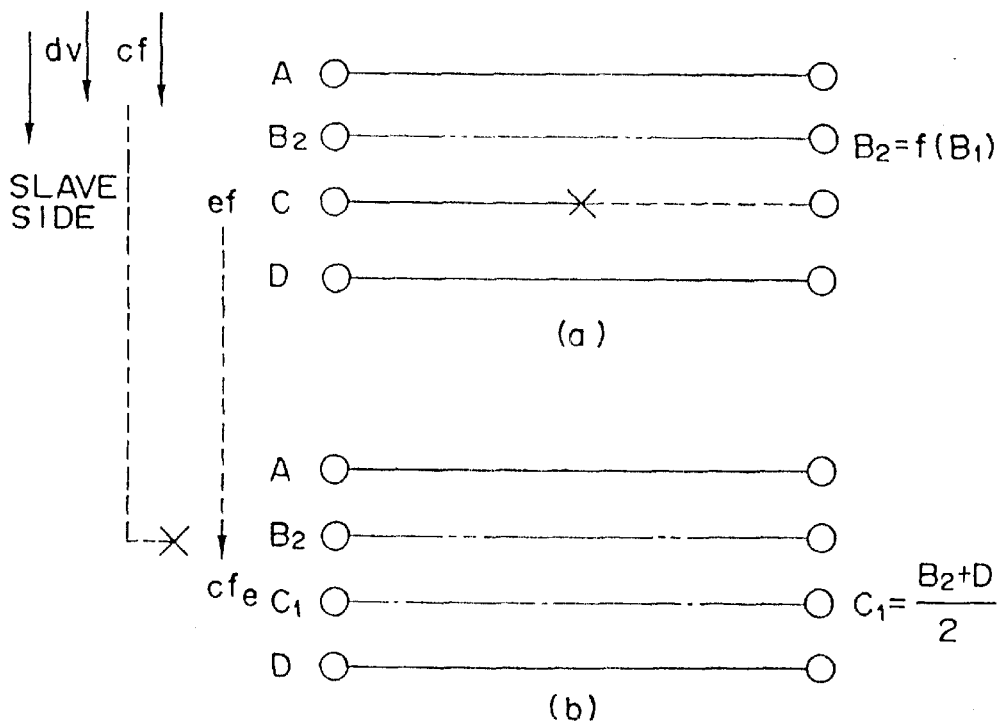
FIG. 5B is a drawing to explain the performance of the decoding device of FIG. 2 by the retouch flag producing circuit of FIG. 5A.

Also in this example, when an error is produced as illustrated in FIG. 4B, similar processing performance is conducted. However, in the case of FIG. 4A, when error flag ef is detected in line-block C at the slave side, modification must be done by using the data of line-block D below the line-block C and modification of line-block B and C must be made from line-blocks A and D, and therefore, deterioration due to the modification becomes large. Therefore, in this embodiment, it is so processed as shown in FIG. 5B. In FIG. 5B(a), error flag ef is hoisted at line-block C to indicate that it requires modification. However, out of the line-blocks B and D, the line-block B has already been modified in the foregoing step and therefore, the data are B2=f(B1)=f[(A+C)/2], and modification flag cf is at "H".

In the present embodiment, when modification information cf is "H" for the line•block being noticed, and the error flag ef is "H" for other line•blocks required for retouching of the said line•block, the modification information cf is neglected. In other words, as shown in FIG. 5B(b), modification information cf for line•block B is neglected and modification is done by using the line•block B2 which has been modified by the master device and encoded, decoded and modified by the slave device and C1=(B2+D)/2 is used as the modification output. In this way the scope of modification can be made as narrow as possible even when error continues at master/slave.

FIG. 6 shows the system composition in the case when recorded signals are given digital-dubbing by the digital VTR of the present embodiment.

In FIG. 6, 300 and 400 represent the recording and reproducing device of digital VTR, etc. The numbers at the unit of 10 and 1 of each section show the identical part when used in the order of 300 and 400.

First the outline of the performance of recording-reproducing device used at digital dubbing is explained using the example of recording-reproducing device 300.

An aural signal and an image signal are respectively input into voice input terminal 301 and image input terminal 302 and converted into digital signals by A/D converters 303 and 304. The time axis of thus converted image signals and aural signals are converted and multiplexed for time axis and via the switch 307, they are supplied to the error correction encoding circuit 308 (hereinafter described as ECC encoding circuit). At this circuit 308, a parity bit for correction of error is added to such multiplex signal to produce the data to be recorded. For reproduction of recorded digital data, it is the general practice to do error correction-encoding for correction of error produced at the time of reproduction of recorded data.

The thus produced digital recorded data are input into recording circuit 309 and thereby recorded on the medium.

At the reproduction side, the digital data having been reproduced from the medium by reproduction circuit 310 are corrected of the error produced upon reproduction at the error correction decoding circuit (hereinafter called ECC decoding circuit) 311 as far as possible. ECC decoding circuit 311 outputs the digital data and interpolation flag (modification flag) ef which are through with error correction, and these output signals are entered into interpolation circuit 312 and the uncorrectable data are interpolated and modified by a publicly known method (for example, by the average value of preceding and succeeding data) according to the modification flag ef produced in response to the data which could not be corrected at the ECC decoding circuit 311. The output signal of interpolation circuit 312 are divided into voice data and image data at the separation circuit 313 and are respectively converted into analog data at A/D converters 314 and 315 and output at output terminals 316 and 317.

This recording-reproducing device is additionally provided with the digital input terminal 306 which is connected to ECC encoding circuit 308 in exchange for the multiplexing circuit 305 via switch 307 in order to execute digital dubbing and the digital data output terminal 318 which is connected to the output end of interpolation circuit 312.

In FIG. 6, at the time of digital dubbing, digital data is output from the digital data output terminal 318 of the recording and reproducing device to be input to a digital data input terminal 406 of the recording and reproducing device 400. At this time, in the recording and reproducing device 400, a switch 407 selects the digital data input terminal 406 and digital data input to the terminal 406 is ECC-encoded and then recorded. In this manner, the recording signal can be dubbed as digital data without conversion into an analog signal.

Figure 7:
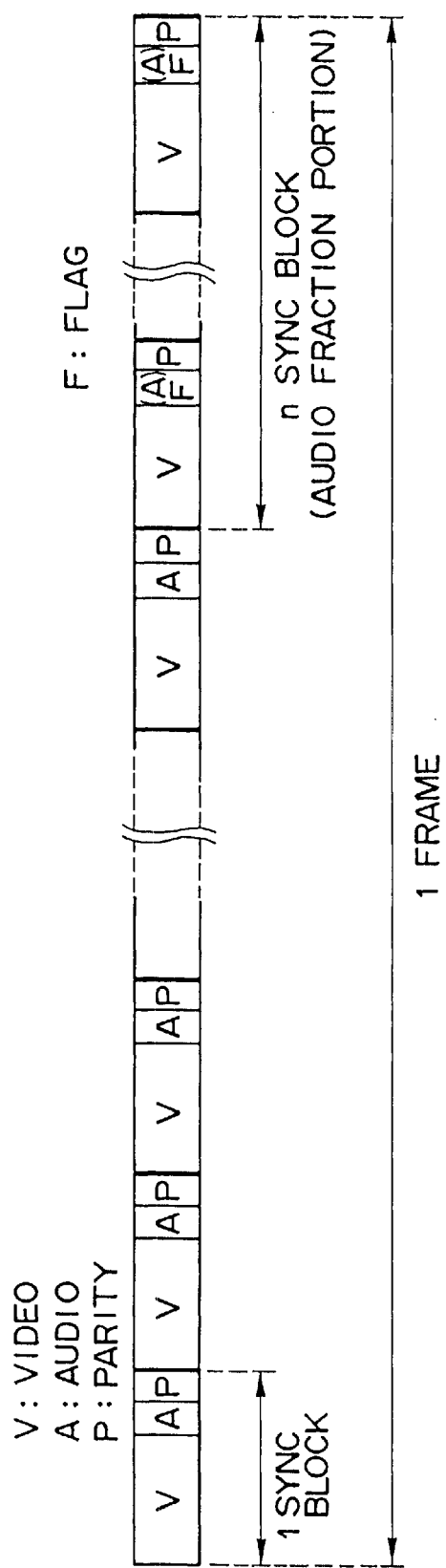
FIG. 7 is a drawing to show the data format of recording and reproduction in the system of FIG. 6.

FIG. 7 shows an example of a recording format of one frame of TV signal applied to a recording and reproducing apparatus of embodiments of the present invention. The one frame comprises a plurality of sync blocks each of which include image data and audio data. "V" denotes a region of the image data, "A" denotes an audio data region and "P" denotes a parity bit region.

Due to the difference between sampling rates of the image and audio data, in the audio data, which contain less information than do the image data, a fraction portion in which there is no data to be recorded may exist in practice.

The present embodiment pays attention to the presence of such fragmentary part and records at such part the data retouch information cf corresponding to the retouch flag cf used in the interpolation circuit 312.

The example of FIG. 7 assumes that such fragmentary part where no voice data are recorded as aforesaid is present in an amount equivalent to one sync block and here, the modification information cf used for the aforesaid dubbing is entered at such part instead of voice data.

In this way the modification information cf before the aforesaid dubbing is added to the dubbing data without providing an area specifically for the interpolation flag, in the recording format, that is, without an increase of redundancy.

Figure 8A:
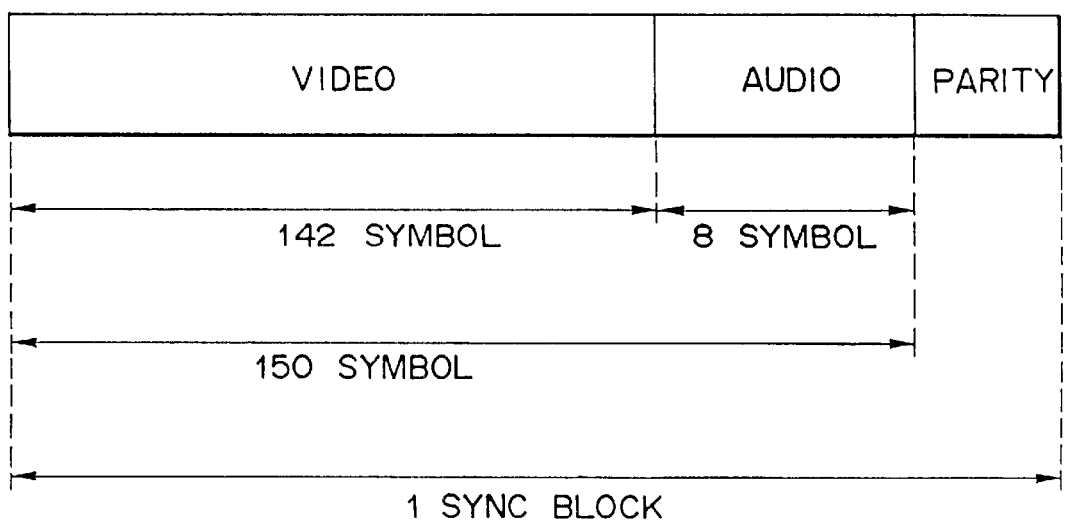
FIG. 8A is a drawing to show a concrete example of composition of one sync block of FIG. 7.

Next in FIG. 8A, explanation is made citing concrete values. In this example, the format at the time of recording of high vision signals after compression-encoding is explained.

High vision signal is sampled by brightness signal 48.6 MHZ and color difference signal 16.2 MHZ and through sub-sampling, DPCM encoding, pigment line sequentializing, etc., data volume is condensed to 105.8184 Mbps. On the other hand, voice data are sampled by 48 KHz, quantized by 16 bits and recorded in 4 channels to become data of 3.072 Mbps.

When these data are punctuated for one frame and one sync block is composed of ⅓ line of image data (V), 4 channels of one sample of voice data (A) and a parity bit (P), the sync block composition as shown in FIG. 8A is obtained. One frame is composed of 3105 sync blocks of FIG. 8A as shown in FIG. 8B. At this time, the amount of data recorded on the voice data area as voice data is 12800 symbols (1 symbol=8 bits) per frame, and out of the 24840 symbols (8×3×1035) corresponding to the voice data area per frame, 12040 symbols (24840−12800) are the fragmentary part where data are not actually recorded.

On the other hand, the interpolation flag (modification informaton) (F) at the time of dubbing only indicates if there remains an error in one sync block composing the error correction symbol (which corresponds to one line-block as aforesaid), and therefore one bit is required for one sync block. At this time, for one frame, it is enough if there exists recording area for 3105 bits=388.125 symbols for the interpolation flag (retouch information cf) at the time of dubbing, and therefore it fits well into the aforesaid fragmentary part where no voice data is recorded.

Figure 8C:
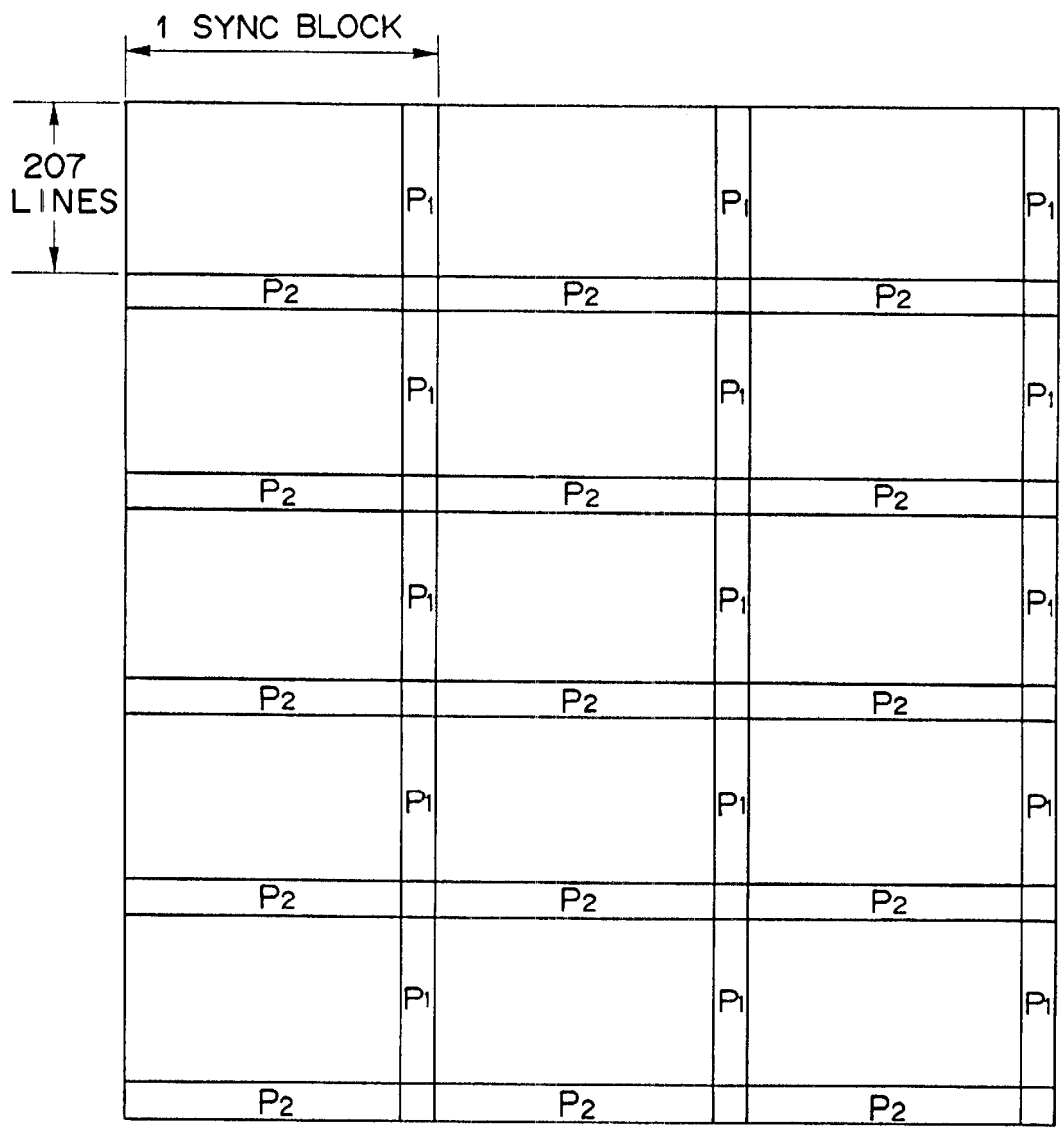
FIG. 8C is a drawing to show another concrete example of composition of one frame in FIG. 7.

When error correction potential is raised and the error correction symbol is made into a double symbol as shown in FIG. 8C, it requires only such additional area that will accept the entry of interpolation flag (modification information cf) at dubbing of 2550 symbols (150×3×5), i.e., 2250 bits= 281.25 symbols. In this case, the required recording area is only 669.375 symbols (388.125+281.25) even when interpolation flags in transverse and longitudinal directions are summed and it fits sufficiently into the fragmentary section of the aforesaid voice data.

As aforesaid, at the interpolation circuit 312 of VTR at reproduction side, the interpolation flag (modification information cf) at dubbing can be inserted into the dubbing data without providing a special recording area and at the interpolation circuit 412 at reproducing system of VTR on the recording side, dubbing data are interpolated utilizing the flag (modification information cf) at the time of dubbing, and thus deterioration of picture quality and sound quality of reproduced signals can be minimized.

To be more concrete, as illustrated in FIG. 4, at the recording side interpolation circuit 412, when the data which could not be corrected upon reproduction of dubbing data is interpolated according to the new interpolation flag ef, for example when interpolation is performed using peripheral (neighboring) pixel data, the interpolation flag (modification information cf) at the time of dubbing of such peripheral pixel is checked and if any pixel which had been interpolated at dubbing exists at the periphery, such pixel is not used for interpolation, thus enabling interpolation to be effected using the more accurate pixel and reducing deterioration of picture quality or sound quality.

FIG. 9 illustrates the dubbing system of another embodiment of the present invenjtion, wherein primary reproducing VTR and secondary recording VTR are both digital VTR's with identical construction.

First their performances at ordinary recording and reproducing time are explained.

Figure 10:
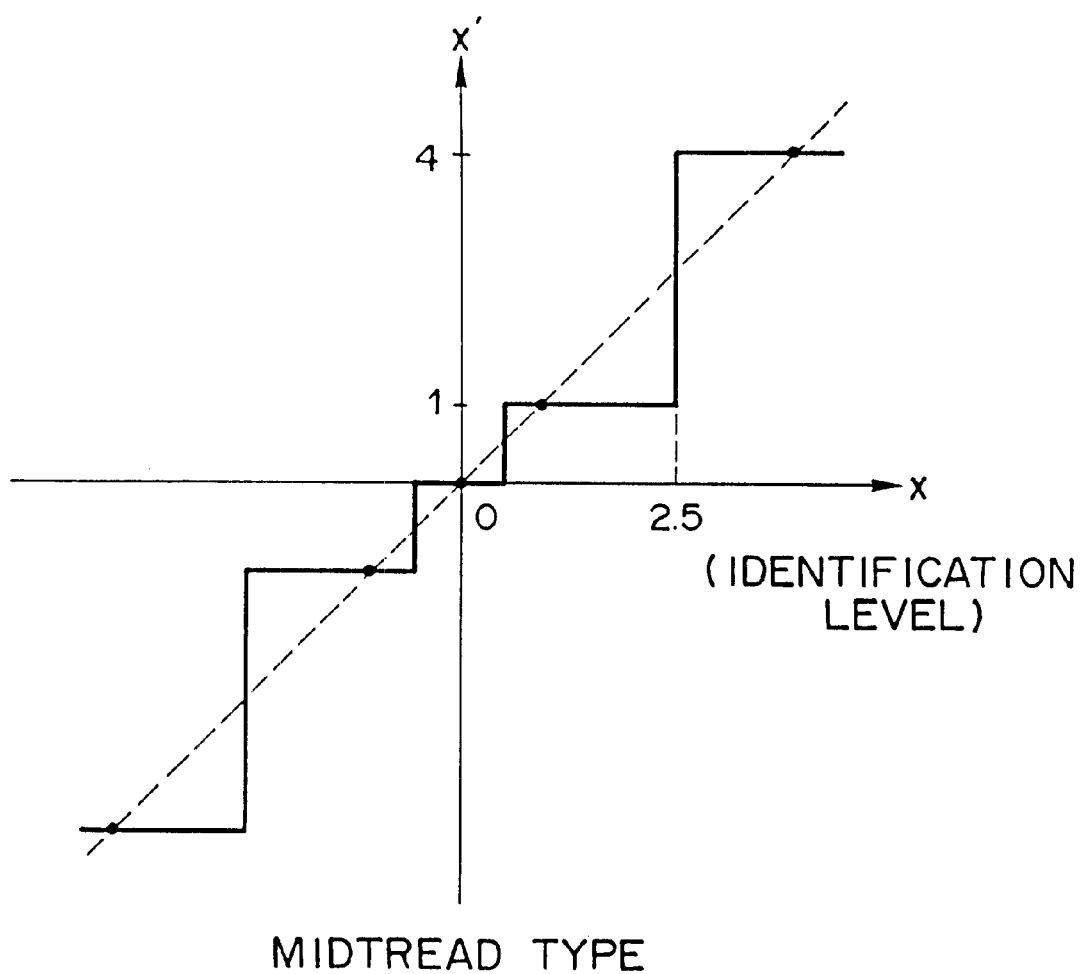
FIG. 10 is a drawing to explain the characteristics of midtread type DPCM.

At normal recording time, analog image signals are entered at input terminal 110, sampled by the sampling clock with frequency more than twice of their maximum frequency, converted into 8 bit digital signals by the analog/digital (A/D) conversion circuit 111 and entered into the compression (high efficiency) encoding circuit 112. At this circuit 112, input signals are given compression encoding wherein a representative value (specific data) not used for the value taken by the processing symbol unit (in this case 8 bit 0–255) exists just like for example the midtread type DPCM having the characteristics shown in FIG. 10, and this encoded signal is entered into the error correction encoding circuit 114 via switch 113. Switch 113 is connected to terminal 102 except when it is connected to dubbing input terminal 101 for being used as the photographing (recording) side VTR at dubbing.

At the error correction encoding circuit 114, input signals receive error correction encoding having the correction ability matching the error rate of magnetic conversion system. For example, Read-Solomon double encoding may be made.

The output signal from error correction encoding circuit 114 is modulated by modulation circuit 115 so that it suits the transmission route and via the wide band recording amplifier which enables high speed digital recording and magnetic head 116, it is recorded on the magnetic tape 117.

At the normal reproduction time, the digital signals recorded on the magnetic tape 117 are reproduced by wide band reproduction amplifier and magnetic head 116, demodulated by demodulation circuit 118 and written into the main memory 119. Simultaneously the demodulated data are input into the error correction decoding circuit 120 and there syndrome calculation and error correction encoding and decoding calculation are conducted for each encoding block. When correction is judged to be possible at circuit 120, the reproduction data stored in the memory 119 are corrected, and if correction is judged to be impossible, a flag indicating that an uncorrectable symbol is present is entered in the interpolation flag memory 121. The unit 127 is the control unit to control writing and reading of the flag for the interpolation flag memory 121.

The data which have been duly corrected are read out of the memory 119 and entered into the flag judging circuit 122.

At the flag judging circuit 122, the code which is not used for compression encoding of the input signal is detected and if it is detected, flag information is entered at the address of interpolation flag memory 121 which corresponds to such data. Thereafter at the compression (high efficiency) decoding circuit 124, a compression encoding signal such as DPCM is decoded and input into the interpolation circuit 125. At interpolation circuit 125, the image data coming from compression decoding circuit 124 are compared with the contents of interpolation flag memory 121 and when interpolation flag is recognized, image data are given such processing as line interpolation. The output signal of interpolation circuit 125 is converted into analog image signal synchronizing with the sampling clock at the digital/analog (D/A) conversion circuit 126 and output at the output terminal 127.

Next the performance at dubbing time is explained.

At the primary VTR, the line or symbol which has been judged uncorrectable as for the output signal of demodulating circuit 118 is substituted for the specific code (data). which is not used at compression encoding by the error correction decoding circuit 120. Such specific code functions as the interpolation flag to be transmitted at dubbing. Flag judging circuit 122 performs flag detection as in the case of ordinary reproducing and enters the flag information into the interpolation flag memory. Image data passes through circuit 122 as they are. Output side dubbing terminal 123 of flag judging circuit 122 inputs the 8-bit image data and clock which have passed through the flag judgment circuit 122 into the secondary VTR terminal 101 via a flat cable.

At secondary VTR, switch 113' is connected to the dubbing input terminal 101' to input the signal from primary VTR. The signals having been input into the input terminal 201' receive error correction encoding, modulation and recording as in the case of ordinary recording.

By the aforesaid dubbing operation, at reproduction of the tape recorded by the secondary VTR, the interpolation flag caused by the error of electromagnetic conversion system of secondary VTR and the interpolation flag caused by the error of primary VTR which is detected by the flag judging circuit 122' are both entered into the interpolation flag memory 121' and the same interpolation processing is given to them at the interpolation circuit 121'. It is of course easy also to differentiate the two interpolation flags and give appropriate interpolation processing to each of them separately.

According to the present invention, the only modification of the hardware of the ordinary VTR needed is the change of input terminal (13, 13', 23, 23') for digital dubbing, the memory (21, 21') working as the 8-bit comparator for flag judgment and the control unit (27, 27') for writing and reading of flag, the scale of addition of hardware thus being extremely small and the basic timing system and sequence at recording and reproduction being exactly the same as those of the ordinary arrangement.

What is claimed is:

1. An encoding apparatus, comprising:
   (a) an inputting unit, arranged to input multiplexed information in which primary information and flag information are multiplexed, the flag information indicating whether or not the primary information is concealed before the input thereof;
   (b) an error check code adding unit, arranged to add to the multiplexed information an error check code for checking an error of the multiplexed information; and
   (c) a recording unit, arranged to record on a recording medium the multiplexed information to which the error check code is added.

2. An apparatus according to claim 1, wherein the primary information includes video information and audio information.

3. An apparatus according to claim 1, wherein the primary information consists of symbols each having a predetermined number of bits and which never have a specific bit pattern, and wherein the flag information is recorded by said recording unit by converting a symbol of the primary information where an uncorrectable error had occurred in the specific bit pattern.

4. An apparatus according to claim 1, wherein the primary information is compression-encoded image information.

5. An apparatus according to claim 1, further comprising a reproducing unit, arranged to reproduce the multiplexed information to which the error check code is added, from the recording medium.

6. An apparatus according to claim 5, further comprising an error correcting unit, arranged to correct an error in the multiplexed information by using the error check code and error flag information indicating an occurrence of an uncorrectable error.

7. An apparatus according to claim 6, further comprising a concealing unit, arranged to conceal the primary information processed through said error correcting unit by using both the flag information reproduced by said reproducing unit and the error flag information produced by said error correcting unit.

8. An encoding apparatus, comprising:
   (a) an inputting unit, arranged to input multiplexed information in which image information and concealment information are multiplexed, the concealment information indicating whether or not the image information is concealed before the input thereof;
   (b) an error check code adding unit, arranged to add to the multiplexed information an error check code for checking an error of the multiplexed information; and
   (c) a transmitting unit, arranged to transmit to a transmission path the multiplexed information to which the error check code is added.

9. An apparatus according to claim 8, wherein the image information is compression-encoded information.

10. An encoding method, comprising:
    (a) an inputting step, of inputting multiplexed information in which primary information and flag information are multiplexed, the flag information indicating whether or not the primary information is concealed before the input thereof;
    (b) an error check code adding step, of adding to the multiplexed information an error check code for checking an error of the multiplexed information; and
    (c) a recording step, of recording on a recording medium the multiplexed information to which the error check code is added.

11. An encoding method, comprising:
    (a) an inputting step, of inputting multiplexed information in which image information and concealment information are multiplexed, the concealment information indicating whether or not whether the image information is concealed before the input thereof;
    (b) an error check code adding step, of adding to the multiplexed information an error check code for checking an error of the multiplexed information; and
    (c) a transmitting step, of transmitting to a transmission path the multiplexed information to which the error check code is added.

* * * * *

UNITED STATES PATENT AND TRADEMARK OFFICE
CERTIFICATE OF CORRECTION

PATENT NO.    : 6,473,879 B1
DATED         : October 29, 2002
INVENTOR(S)   : Yoshiki Ishii et al.

It is certified that error appears in the above-identified patent and that said Letters Patent is hereby corrected as shown below:

Title page,
Item [56], FOREIGN PATENT DOCUMENTS,
"60133573" should read -- 60-133573 --;
"61018276" should read -- 61-018276 --;
"61112259" should read -- 61-112259 --;
"62026681" should read -- 62-026681 --;
"162920" should read -- 01-062920 --;
"173560" should read -- 01-073560 --;
"01062920 3/1989" should be deleted;
"01073560 3/1989" should be deleted;
"02108279" should read -- 02-108279 --; and
"2108279 4/1990" should be deleted.

Column 1,
Line 7, "07,550,906," should read -- 07/550,906, --; and
Line 42, "of" should read -- of the --.

Column 3,
Lines 2 and 5, "the" (first occurrence) should read -- a --;
Line 33, "dubbing" should read -- a dubbing --; and
Line 40, "and' should read -- are --.

Column 5,
Line 47, "FIG. 4B(C)" should read -- FIG. 4B(c) --.

Column 6,
Line 5, "of" should read -- the --;
Line 13, "flag" should read -- flag ef --; and
Line 15, "noticed" should read -- processed --.

Column 7,
Line 3, "error" should read -- errors --; and
Line 20, "are" should read -- is --.

Column 8,
Line 60, "invenjtion," should read -- invention, --.

UNITED STATES PATENT AND TRADEMARK OFFICE
CERTIFICATE OF CORRECTION

PATENT NO.    : 6,473,879 B1
DATED         : October 29, 2002
INVENTOR(S)   : Yoshiki Ishii et al.

It is certified that error appears in the above-identified patent and that said Letters Patent is hereby corrected as shown below:

<u>Column 9,</u>
Line 62, "(data)." should read -- (data) --.

<u>Column 12,</u>
Line 13, "whether" (second occurrence) should be deleted.

Signed and Sealed this

Twenty-second Day of July, 2003

JAMES E. ROGAN
*Director of the United States Patent and Trademark Office*